US012653369B2

(12) United States Patent
Khankarli

(10) Patent No.: US 12,653,369 B2
(45) Date of Patent: Jun. 16, 2026

(54) FOLDABLE, QUICKLY DEPLOYABLE CLEANING APPARATUS

(71) Applicant: Mr. Dripman, LLC, Dallas, TX (US)

(72) Inventor: Kareem Khankarli, Dallas, TX (US)

(73) Assignee: MR. DRIPMAN, LLC, Dallas, TX (US)

( * ) Notice: Subject to any disclaimer, the term of this patent is extended or adjusted under 35 U.S.C. 154(b) by 0 days.

(21) Appl. No.: 19/397,729

(22) Filed: Nov. 21, 2025

(65) Prior Publication Data

US 2026/0144424 A1 May 28, 2026

Related U.S. Application Data

(60) Provisional application No. 63/726,030, filed on Nov. 27, 2024.

(51) Int. Cl.

| | |
|---|---|
| ***A47L 13/20*** | (2006.01) |
| ***A47L 13/254*** | (2006.01) |
| ***B25G 1/04*** | (2006.01) |
| ***B25G 3/38*** | (2006.01) |

(52) U.S. Cl.

CPC .............. *A47L 13/254* (2013.01); *B25G 1/04* (2013.01); *B25G 3/38* (2013.01); *A47L 13/20* (2013.01)

(58) Field of Classification Search

CPC .......... A47L 13/20; A47L 13/04; A47L 13/42; A47L 13/258

See application file for complete search history.

(56) References Cited

U.S. PATENT DOCUMENTS

| | | | | |
|---|---|---|---|---|
| 1,514,051 A * | 11/1924 | Jumonville | A47L 13/142 15/120.2 |
| 3,795,933 A * | 3/1974 | Seufert | A47L 13/257 403/93 |
| 9,301,597 B2 * | 4/2016 | Heintschel | A46B 5/0045 |
| 9,918,607 B1 * | 3/2018 | Lewis | A47L 13/253 |
| 2002/0104179 A1 * | 8/2002 | Mayne | A47L 13/146 15/119.2 |
| 2003/0000036 A1 * | 1/2003 | Fan | A47L 13/142 15/119.1 |
| 2021/0186295 A1 * | 6/2021 | Ross | A47L 13/11 |

FOREIGN PATENT DOCUMENTS

WO WO-2022253176 A1 * 12/2022 ............. A47L 13/42

* cited by examiner

*Primary Examiner* — Michael D Jennings
(74) *Attorney, Agent, or Firm* — Johnston IP Law, PLLC

(57) ABSTRACT

In one instance, a foldable, cleaning apparatus includes a handle coupled to a pivot connection. The pivot connection is rotatable about at least two axes. The apparatus further includes a base member with a slide track coupled to a first side of the base member. The slide track extends from a first distal end to at least a medial portion of the base member. The pivot connection slidably couples to the slide track and is operable to move along at least a portion of the slide track. The apparatus further includes a mop material and a releasable attachment device. The mop material is coupled at least partially to the second side of the base member, which faces a floor when the apparatus is deployed and in use. The releasable attachment device is coupled proximate the medial portion of the base member. Other apparatuses are presented as well.

19 Claims, 12 Drawing Sheets

FOLDABLE, QUICKLY DEPLOYABLE CLEANING APPARATUS

CROSS-REFERENCE TO RELATED APPLICATION

This application claims the benefit of U.S. Provisional Application Ser. No. 63/726,030, filed by Kareem Khankarli, on Nov. 27, 2024, entitled "Foldable, Quickly Deployable Cleaning Apparatus," which is incorporated herein by reference in its entirety for all purposes.

TECHNICAL FIELD

This application is directed, in general, to cleaning apparatuses for use on floors, and more specifically, to foldable, quickly deployable cleaning apparatuses.

BACKGROUND

The following discussion of the background is intended to facilitate an understanding of the present disclosure only. It should be appreciated that the discussion is not an acknowledgement or admission that any of the material referred to was part of the common general knowledge of the priority date of the application.

Athletic courts are formed from a number of different materials and may become slippery when wet. For example, wood flooring, which is often used for indoor courts, are susceptible to becoming particularly slippery due to sweat from athletes or other forms of moisture accumulating on the floor. The slippery nature of the courts create safety challenges to players, especially when the sport requires quick motions with sudden bursts of movement, such as seen in basketball, volleyball, wrestling, pickleball, badminton, racquetball, paddle tennis, and court tennis.

Often time, the courts need to be cleaned quickly. For example, the floor may need to be cleaned during a timeout or while activity on the court has moved elsewhere. In other examples, play may need to be suspended until the floor can be cleaned, causing fans and players to wait until the floor can be sufficiently dried for safe play to resume. While cleaning apparatuses have been used for this, improvements are still desirable.

SUMMARY

According to one embodiment, a foldable, cleaning apparatus includes a longitudinal handle having a first end and a second end, with a pivot connection coupled to the second end of the longitudinal handle. The pivot connection is rotatable about at least two axes. The cleaning apparatus further includes a longitudinal base member having a first side and a second side, with a slide track coupled to the first side of the longitudinal base member. The slide track extends from a first distal end to at least a medial portion of the longitudinal base member. The pivot connection slidably couples to the slide track and is operable to move along at least a portion of the slide track. The cleaning apparatus further includes a mop material and a releasable attachment device. The mop material is coupled at least partially to the second side of the longitudinal base member, wherein the second side faces a floor when the foldable cleaning apparatus is deployed and in use. The releasable attachment device is coupled proximate the medial portion of the longitudinal base member.

According to another illustrative embodiment, a foldable, floor cleaning apparatus includes a handle having a first end and a second end, a clip assembly fixed to the second end of the handle, wherein the clip assembly is rotatable about at least two axes, a base member having a first side and a second side, and a slide track coupled to the first side of the base member and extending from a first distal end to a second distal end of the base member. The slide track includes a rod, wherein the clip assembly is coupled to the rod and is operable to move along the slide track between the first distal end and a medial portion of the base member. The cleaning apparatus further includes a first releasable attachment device proximate the medial portion of the base member that is configured to hold the clip assembly in place when the foldable, floor cleaning apparatus is deployed and in use, and a second releasable attachment device for coupling the handle to the first side of the base member when the foldable, floor cleaning apparatus is in a folded, storage position.

According to yet another illustrative embodiment, a cleaning apparatus includes a handle having a first end and a second end, a pivot connection coupled to the second end of the handle, wherein the pivot connection is rotatable about at least two axes, a base member having a first side and a second side, and a c-channel positioned on the first side of the base member, wherein the c-channel extends at least a portion of a length of the base member. The cleaning apparatus further includes a slide track coupled to the first side of the base member, such that the slide track extends from a first distal end beyond a medial portion of the base member. The pivot connection couples to the slide track and is operable to move along the slide track between the first distal end and the medial portion of the base member. The cleaning apparatus further includes a stop-gap plate attached to the base member proximate the medial portion, wherein the stop-gap plate is operable to engage the pivot connection when the cleaning apparatus is deployed. The cleaning apparatus further includes a first releasable attachment device positioned proximate the medial portion of the rectangular base member and a second releasable attachment device. The first releasable attachment device configured to hold the pivot connection in place when the cleaning apparatus is deployed and in use, and the second releasable attachment device is for coupling the handle to the first side of the base member when the cleaning apparatus is in a folded, storage position. The cleaning apparatus further includes a mop material coupled at least partially to the second side of the base member, wherein in the second side faces a floor when the cleaning apparatus is deployed and in use.

Other embodiments are presented further below.

DESCRIPTION OF THE DRAWINGS

Illustrative embodiments of the present disclosure are described in detail below with reference to the attached drawing figures, which are incorporated by reference herein and wherein.

DETAILED DESCRIPTION

In the following detailed description of the preferred embodiments, reference is made to the accompanying drawings that form a part hereof, and in which is shown, by way of illustration, specific embodiments in which the disclosure may be practiced. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the disclosure, the description may omit certain information known to those skilled in the art. The following detailed description is, therefore, not to be taken in a limiting sense, and the scope of the present invention is defined only by the claims.

Unless otherwise indicated, as used throughout this document, "or" does not require mutual exclusivity.

Figure 1:
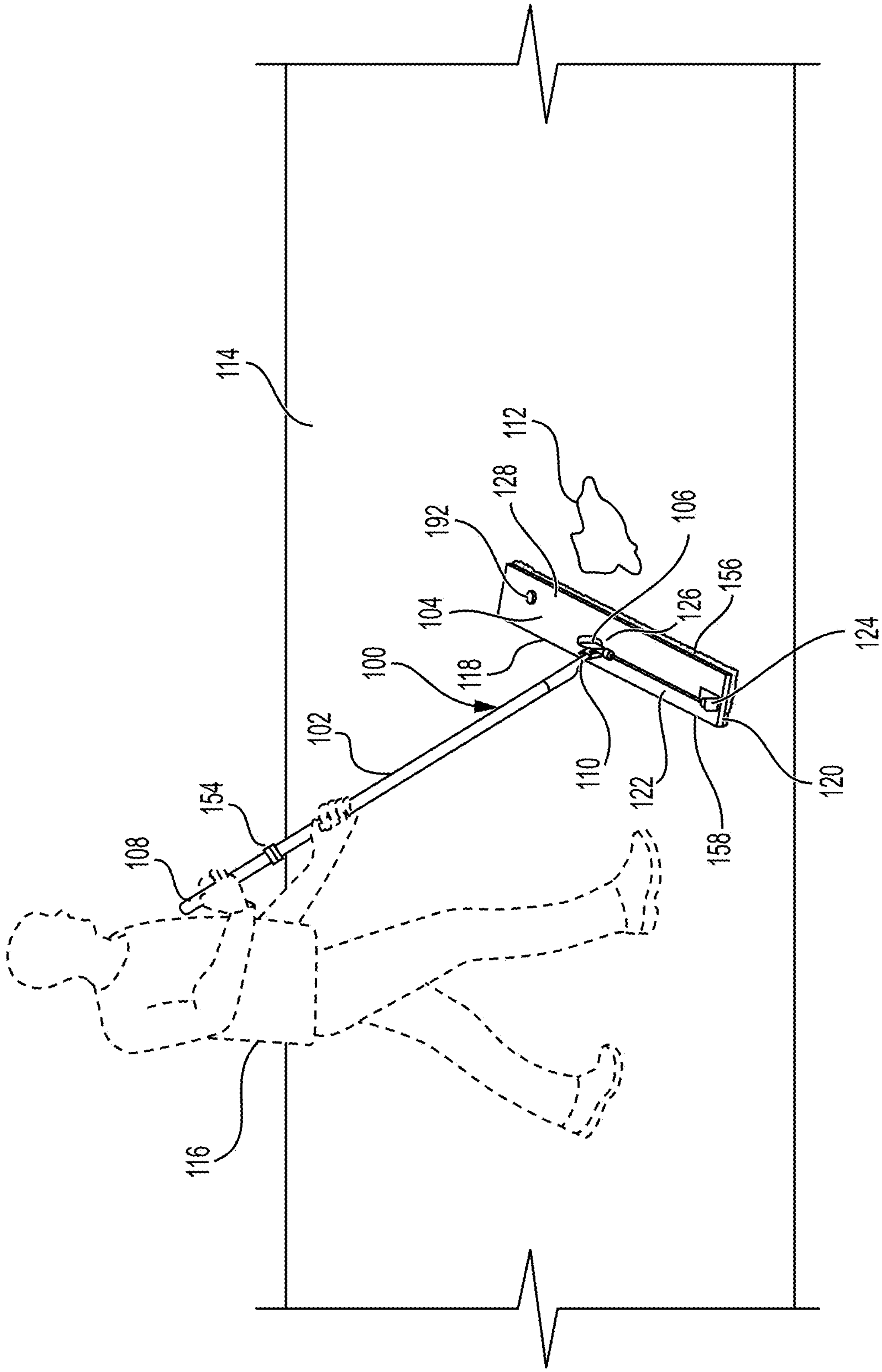
FIG. 1 illustrates a schematic diagram of an illustrative embodiment of a foldable, quickly deployable cleaning apparatus in use.

Referring to the drawings and initially to FIG. 1, a schematic diagram of a user 116 drying a wet spot 112 on a floor 114 using an illustrative embodiment of a foldable, quickly fully deployable cleaning apparatus 100 is presented. The cleaning apparatus 100 is presented in a deployed position.

The cleaning apparatus 100 includes a longitudinal handle 102 connected to a longitudinal base member 104 via a pivot connection or clip 106. The longitudinal handle 102 has a first end 108 and an opposing, second end 110. The first end 108 of the handle 102 is configured for the user 116 to grab the cleaning apparatus 100. The second end 110 of the longitudinal handle 102 is connected to the pivot connection 106. The pivot connection 106 is operable to rotate about two axes to allow the cleaning apparatus 100 to be folded and to articulate when in the deployed position.

The longitudinal base member 104 has a first side 118 and an opposing, second side 120. The pivot connection 106 is connected to the first side 118 of the base member 104. In the deployed position, the second side 120 of the longitudinal base member 104 contacts the floor 114. An absorbent material 128, operable for removing moisture from the floor 114, is positioned on the second side 120 of the base member 104. The longitudinal base member 104 further includes a first longitudinal edge 156, which is the leading edge of the base member 104 when the cleaning apparatus is deployed, and a second longitudinal edge 158, which is the trailing edge of the base member 104.

The cleaning apparatus 100 further includes a slide track 122 coupled to the first side 118 of the longitudinal base member 104. The slide track 122 extends from a distal end 124 of the longitudinal base member 104 to a medial portion 126 of the longitudinal base member 104. The pivot connection 106 is slidably coupled to the slide track 122 and is operable to move along at least a portion of the slide track 122. The pivot connection 106 slides along the slide track 122 when moving the cleaning apparatus 100 between a fully-folded and fully deployed position.

The cleaning apparatus 100 is operable to be transitioned between a folded and deployed position quickly and easily to allow the floor 114 to be dried in an expedient and hassle-free manner. The cleaning apparatus 100 is also configured to maximize efficiency in cleaning a large surface area of the floor 114. In one non-limiting example, the cleaning apparatus 100 may be used during a basketball game where players may drop sweat on the floor during play or when they fall, making the floor potentially slippery. Being able to dry the floor quickly to limit interference in play would be beneficial. Thus, having a cleaning apparatus with the flexibility to quickly transition from a folded position to a deployed position, quickly dry a large surface area, and then refold and be secured for transportation and/or storage is desirable. One of ordinary skill in the art will appreciate that these features may be desirable alone or in combination. One of ordinary skill in the art will further appreciate that these features may be desirable in scenarios that are not time sensitive, as well as in domestic settings.

Figure 2A:
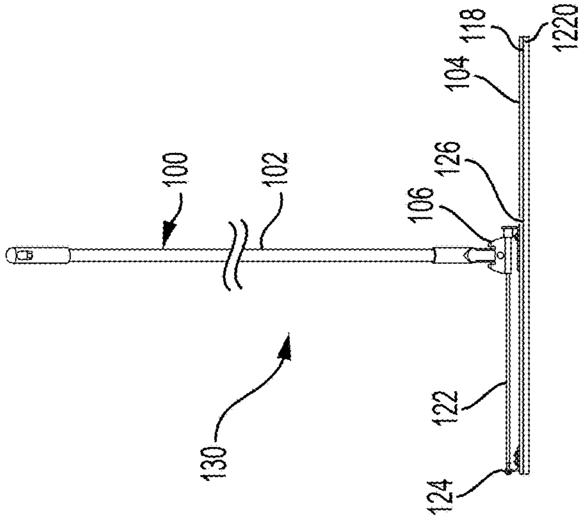
FIG. 2A illustrates an embodiment of the foldable, quickly deployable cleaning apparatus of FIG. 1 in a deployed configuration.
Figure 2B:
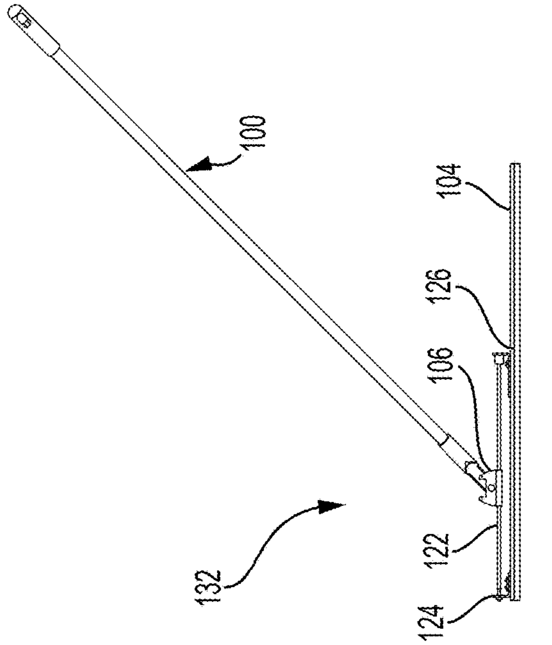
FIG. 2B illustrates an embodiment of the foldable, quickly deployable cleaning apparatus of FIG. 1 in a semi-folded configuration.
Figure 2C:
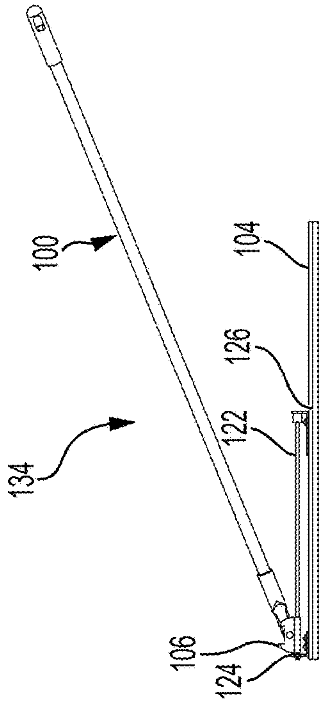
FIG. 2C illustrates an embodiment of the foldable, quickly deployable cleaning apparatus of FIG. 1 in a semi-folded configuration.
Figure 2D:
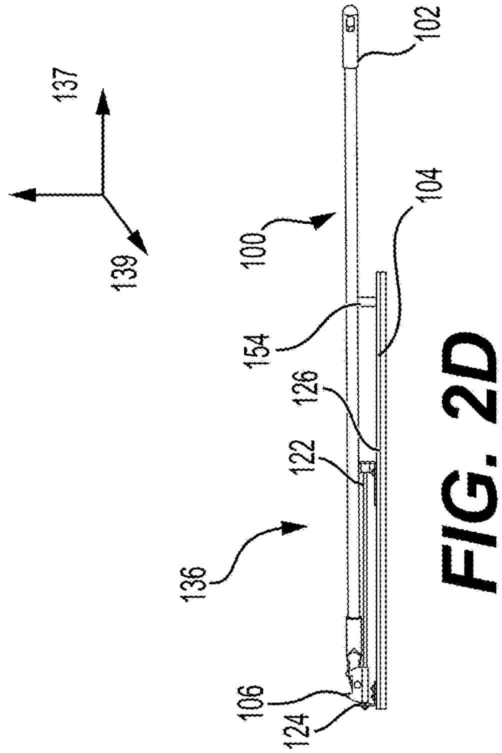
FIG. 2D illustrates an embodiment of the foldable, quickly deployable cleaning apparatus of FIG. 1 in a fully-folded configuration.

Referring now primarily to FIGS. 2A-2D, schematic diagrams of the foldable, quickly deployable cleaning apparatus 100 in fully-folded, semi-folded and fully unfolded (deployed) orientations are presented. FIG. 2A illustrates the cleaning apparatus 100 in a fully unfolded position 130, or fully deployed, position ready to be used to clean the floor 114, as illustrated in FIG. 1. FIG. 2B illustrates the cleaning apparatus 100 in a first semi-folded position 132. FIG. 2C illustrates the cleaning apparatus 100 in second semi-folded position 134. FIG. 2D illustrates the cleaning apparatus 100 in a fully-folded position 136. The cleaning apparatus 100 may be placed in the fully-folded position 136 for storage or to reduce the cleaning apparatus's profile when not in active use cleaning the floor.

Still referring to FIGS. 2A-2D, the cleaning apparatus 100 transitions between the fully unfolded or deployed position 130 and the fully-folded position 136 by sliding along the slide track 122. In FIG. 2A, the pivot connection 106 is located near the medial portion 126 of the longitudinal base member 104 with the longitudinal handle 102 in an upright position. The cleaning apparatus 100 is in the deployed position 130.

In FIG. 2B, the pivot connection 106 slides outward along the slide track 122, toward the distal end 124 of the base member 104 and is illustrated as being between the medial portion 126 and the distal end 124 of the base member 104 with the longitudinal handle 102 angled relative to the slide track 122. The cleaning apparatus 100 is in the first semi-folded position 132.

In FIG. 2C, the pivot connection 106 slides to the distal end 124 of the base member 104, with the longitudinal handle 102 angled even more relative to the slide track 122 than shown in FIG. 2B. The cleaning apparatus 100 is in the second semi-folded position 134.

In FIG. 2D, the cleaning apparatus 100 is shown in the fully-folded position 136 with the pivot connection 106 positioned near the distal end 124 of the base member 104 and the longitudinal handle 102 parallel to both the slide track 122 and the base member 104. FIG. 2D illustrates the cleaning apparatus 100 as being oriented horizontally against the ground while in the fully-folded position 136. However, it should be appreciated that the cleaning apparatus 100 may also be oriented in a vertical position or other positions for transport or storage. The pivot connection 106 allows the longitudinal handle 102 to move with respect to a first axis, or plane, 137 and a second axis, or plane, 139.

Figure 3:
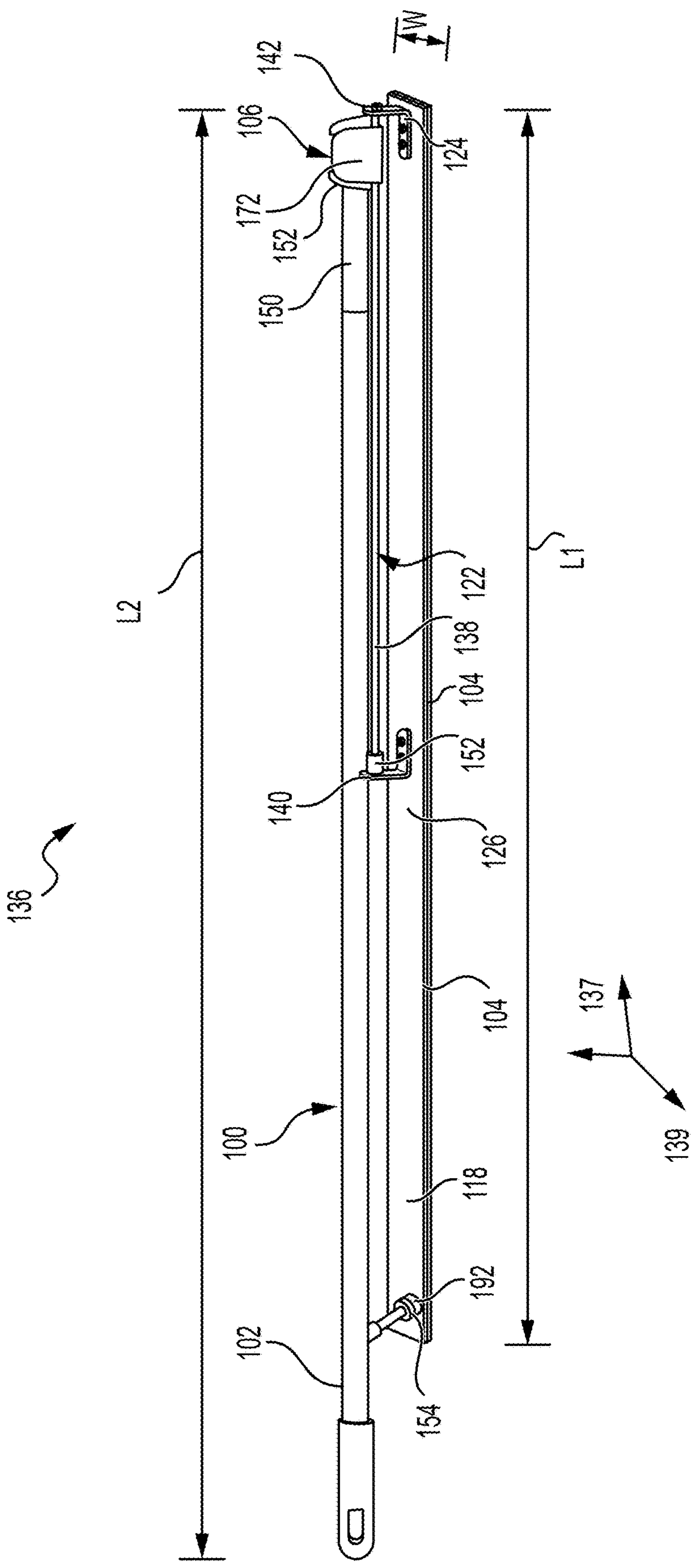
FIG. 3 illustrates a perspective, front view of an embodiment of the foldable, quickly deployable cleaning apparatus of FIG. 1 in a fully-folded configuration.

Referring now primarily to FIG. 3, an illustrative embodiment of the cleaning apparatus 100 is shown in the fully-folded position 136. The longitudinal handle 102 is parallel to the slide track 122 and the base member 104. The longitudinal handle 102 is connected to the pivot connection 106 by a harness or sleeve 150. In some embodiments, the longitudinal handle 102 fits inside the sleeve 150 and fasteners connect the handle 102 to the sleeve 150 to prevent the handle from sliding out of the sleeve 150. In other embodiments, the sleeve 150 may be press-fit around the handle 102 to prevent disengagement.

The slide track 122 includes a rod 138, a medial slide stop 140, a distal slide stop 142, and a first releasable attachment device 152. As previously mentioned, the slide track 122 is connected to the first side 118 of the longitudinal base member 104. The medial slide stop 140 is positioned adjacent to the medial portion 126 of the base member 104 and the distal slide stop 142 is positioned adjacent to the distal end 124 of the base member 104. The rod 138 extends between the medial slide stop 140 and the distal slide stop 142. The pivot connection 106 is operable to engage with the rod 138, allowing the pivot connection 106 to slide between the medial slide stop 140 and the distal slide stop 142 (see discussion of FIGS. 4-5 below for further discussion of the pivot connection 106).

The first releasable attachment device 152 is positioned on the medial slide stop 140 and is operable to engage the pivot connection 106 when the cleaning apparatus is in the fully unfolded or deployed orientation. In some embodiments, the rod 138 extends through the first releasable attachment device 152 to connect to the medial slide stop 140. The first releasable attachment device 152 is strong enough to hold the pivot connection 106 against the medial slide stop 140 while the cleaning apparatus 100 is in use. The first releasable attachment device 152 has a quick release capability that allows a user to quickly disengage the pivot connection 106 from the medial slide stop 140 to allow the cleaning apparatus 100 to quickly fold. In some embodiments, the first releasable attachment device 152 is a magnetic member. In yet some embodiments, first releasable attachment device 152 is configured such that the user 116 could apply force by their foot to disengage the first releasable attachment device 152 from the medial slide stop 140. In other embodiments, the first releasable attachment device 152 is a clip or fastener. In some aspects, the first releasable attachment device 152 could be released using a button on the handle 102 or other releasing mechanism (not shown).

In some embodiments, a length L1 of the base member 104 is between 25 and 125 percent of a length L2 of the handle 102. In yet some embodiments, the length L1 of the base member 104 is between 50 and 90 percent of the length L2 of the handle 102. In some embodiments, a width W of the base member 104 is between 1 and 6 inches. In yet some embodiments, the width W of the base member 104 is between 2 and 4 inches.

In some embodiments, a second releasable attachment device 154 is operable to hold the longitudinal handle 102 and the longitudinal base member 104 together when the cleaning apparatus 100 is in the fully-folded position. The second releasable attachment device 154 may be positioned proximate the first end 108 of the handle 102. In some embodiments, the second releasable attachment device 154 is a magnetic member. In one illustrative embodiment, the second releasable attachment device 154 is a magnet that is affixed to the longitudinal handle 102 and the base member 104 is formed from a metallic material. In another illustrative embodiment, the second releasable attachment device 154 is affixed to the longitudinal handle 102 and is operable to connect with a third releasable attachment device 192 positioned on the base member 104. In some embodiments, both the second and third releasable attachment devices 154, 192 are magnets.

Figure 4:
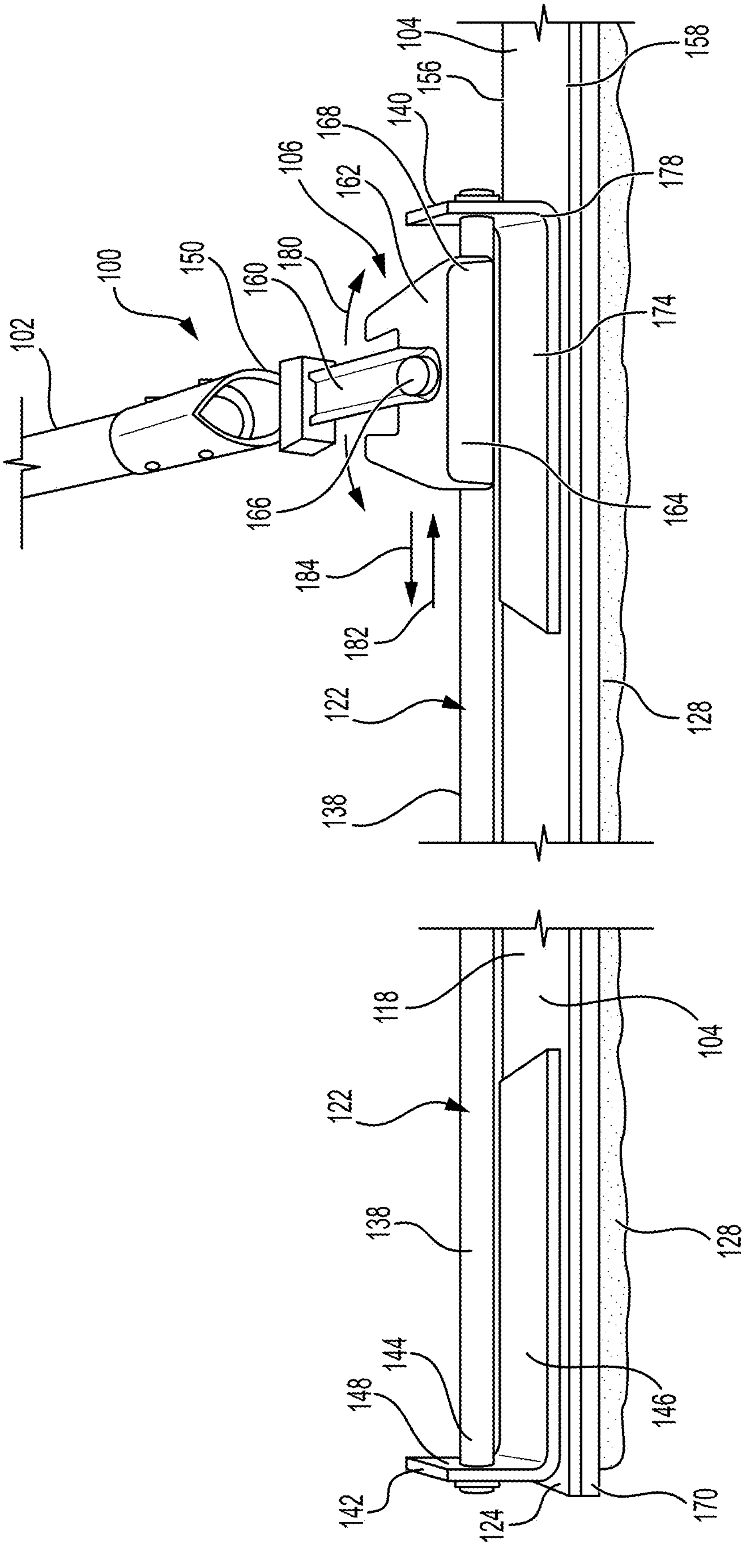
FIG. 4 illustrates a partial, perspective view of a back portion of an embodiment of the foldable, quickly deployable cleaning apparatus of FIG. 1.
Figure 5:
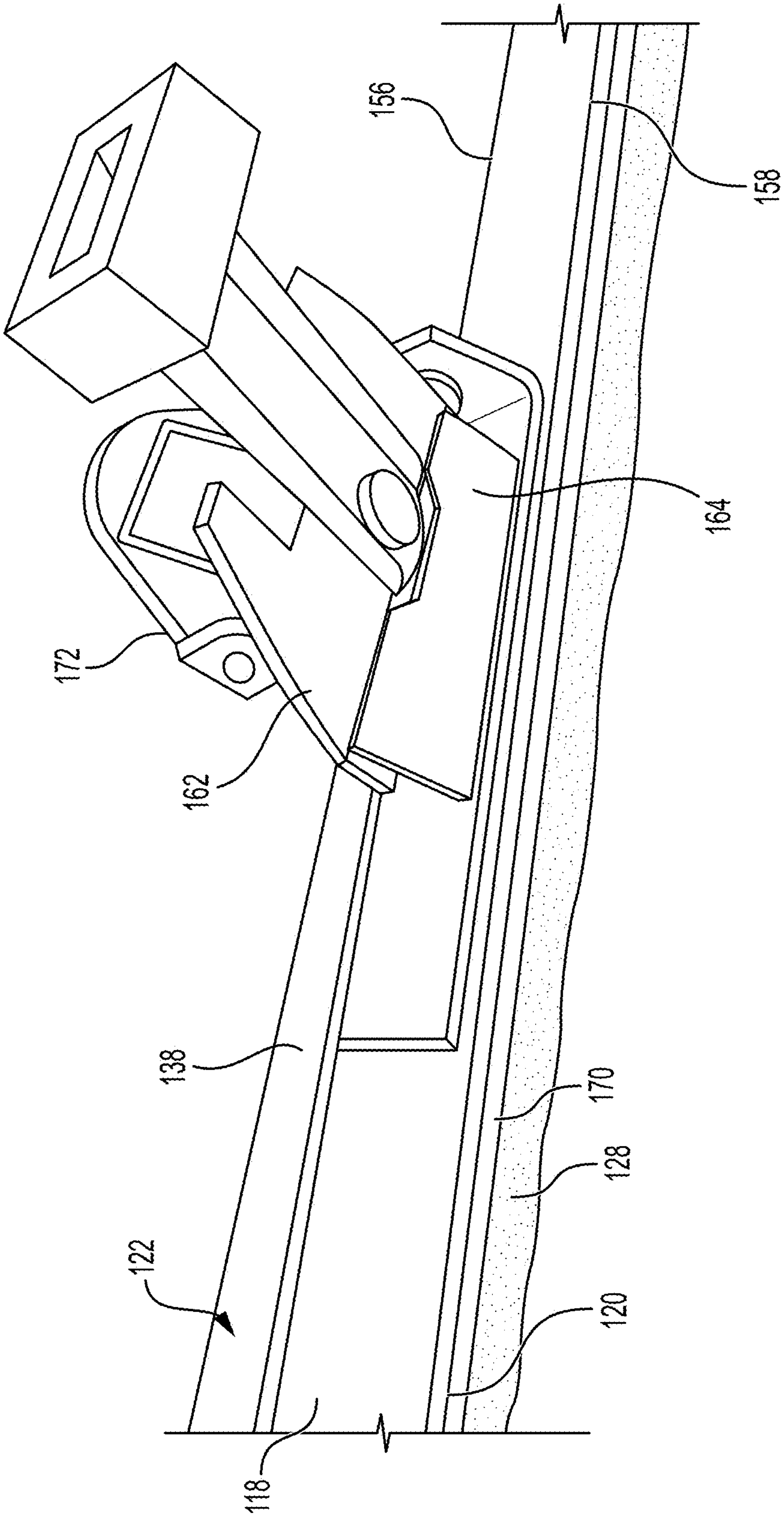
FIG. 5 illustrates a partial, perspective view of a back portion of an embodiment of the foldable, quickly deployable cleaning apparatus of FIG. 1.

Referring now primarily to FIGS. 4-5, detailed, partial views of the pivot connection 106 and the slide track 122 are illustrated. The distal slide stop 142 portion of the slide track 122 is joined to the first side 118 of the base member 104. In some embodiments, the distal slide stop 142 has an "L" shape with a first leg 146 being parallel to the first side 118 of the base member 104 and a second leg 148 being perpendicular to the first side 118 of the base member 104. A distal end 144 of the rod 138 is connected to the distal slide stop 142. In some embodiments, the distal end 144 of the rod 138 is connected to the second leg 148 of the distal slide stop 142. In alternative embodiments (not shown), the slide track may be grooves formed in the base member operable to receive a pivot connection and allow the pivot connection to slide along portions of the base member.

The pivot connection 106 may include a post 160, a pivot plate 162, and a first articulating joint 166 at the junction between the post 160 and the pivot plate 162. The post 160 is connected to the sleeve 150, which is connected to the handle 102. In some embodiments, the post 160 and the sleeve 150 are one integral piece. The first articulating joint 166 allows the post 160 and, thus, the handle 102 to move relative to the pivot plate 162, as shown by arrow 180.

The pivot plate 162 may further includes a clip 172 (illustrated in FIG. 5 but not shown if FIG. 4 for image clarity) for engaging the rod 138 of the slide track 122 forming a second articulating joint 168. The pivot plate 162 can rotate about the rod 138 while also sliding along the rod 138 between the medial slide stop 140 and the distal slide stop 142, as represented by arrows 184 and 182, respectively. In some aspects, the clip 172 may be removable from the rod 138 to allow for a modular system.

In some embodiments, the pivot connection 106 includes a roll plate 164 connected to the pivot plate 162 that is configured to engage the base member 104 when the cleaning apparatus 100 is deployed and the longitudinal handle 102 has been tilted toward the user 116. The roll plate 164 is operable to prevent the base member 104 from flipping or rolling onto its first longitudinal edge 156 when force has been applied to the base member 104. In some aspects, the roll plate 164 may engage a portion of the medial slide stop 140, which is positioned on top of the base member 104.

Similar to the distal slide stop 142 described above, in some embodiments, the medial slide stop 140 also has an "L" shape with a first leg 174 being parallel to the first side 118 of the base member 104 and a second leg 176 being perpendicular to the first side 118 of the base member 104. A medial end 178 of the rod 138 is connected to the medial slide stop 140. In this configuration, the roll plate 164 may engage the first leg 174 of the medial slide stop 140, which is raised above the base member 104.

The cleaning apparatus 100, further includes the absorbent or cleaning material 128 that is attached to the second side 120 of the base member 104 for cleaning debris or moisture. The absorbent material 128 may be attached to the second side 120 of the base member 104 using a third releasable attachment device 170. In some embodiments, the third releasable attachment device 170 may be velcro or other type of fastening tape. In some aspects, the absorbent material 128 may be washed after use and reused. In yet some aspects, the absorbent material 128 may be disposable.

Referring now generally to FIGS. 6A-10, an illustrative embodiment of a foldable, quickly deployable cleaning apparatus 200 is presented. The cleaning apparatus 200 may be used in a similar context as the cleaning apparatus 100 illustrated in FIG. 1. For example, the cleaning apparatus 200 may be utilized by the user 116 to dry the wet spot 112, or otherwise clean the floor 114. Likewise, the cleaning apparatus 200 is foldable and securable in the folded position to allow for easier storage and portability, and is configured to quickly and easily go from deployed to folded and vice versa.

The cleaning apparatus 200 includes a longitudinal handle 202 connected to a base member 204 via a pivot connection or clip assembly 206. The longitudinal handle 202 has a first end 208 and an opposing, second end 210. The first end 208 of the handle 202 is configured for the user to grab the cleaning apparatus 200. The second end 210 of the longitudinal handle 202 is connected to the pivot connection 206. The pivot connection 206 is operable to rotate about at least two axes to allow the cleaning apparatus 200 to be folded and to articulate when in the deployed position. In some aspects, the pivot connection 206 allows the longitudinal handle 202 to move with respect to a first axis, or plane, 237 and a second axis, or plane, 239.

The base member 204 has a first side 218 and an opposing, second side 220. In the deployed position, the second side 220 of the base member 204 contacts the floor. A cleaning material 228, for cleaning debris or removing moisture from the floor, may be positioned on the second side 220 of the base member 204. In some aspects, the cleaning material 228 is an absorbent material.

The cleaning apparatus 200 further includes a slide track 222 coupled to the first side 218 of the base member 204. The pivot connection 206 is connected to the first side 218 of the base member 204 via the slide track 222. The slide track 222 extends from a first distal end 224 of the base member 204 to at least a medial portion 226 of the base member 204. In some embodiments, the slide track 222 extends past the medial portion 226. In yet some embodiments, the slide track 222 extends from the first distal end 224 to a second distal end 225 of the base member 204.

The pivot connection 206 is slidably coupled to the slide track 222 and is operable to move along a portion of the slide track 222 between the first distal end 224 and the medial portion 226 of the base member 204. The pivot connection 206 slides along the slide track 222 when moving the cleaning apparatus 200 between a fully-folded and fully deployed position.

Figure 6A:
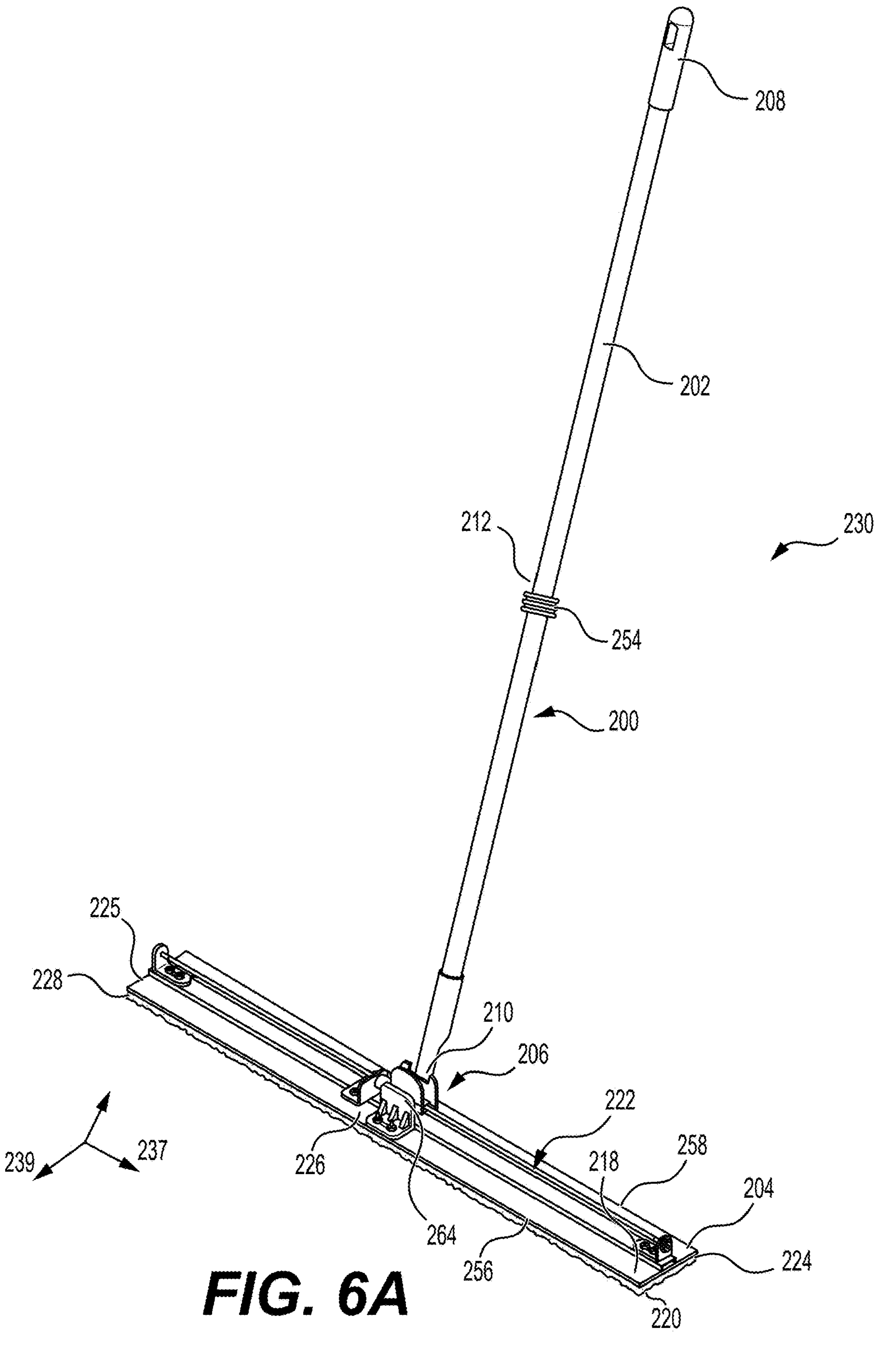
FIG. 6A illustrates another embodiment of a foldable, cleaning apparatus in a deployed configuration.
Figure 6B:
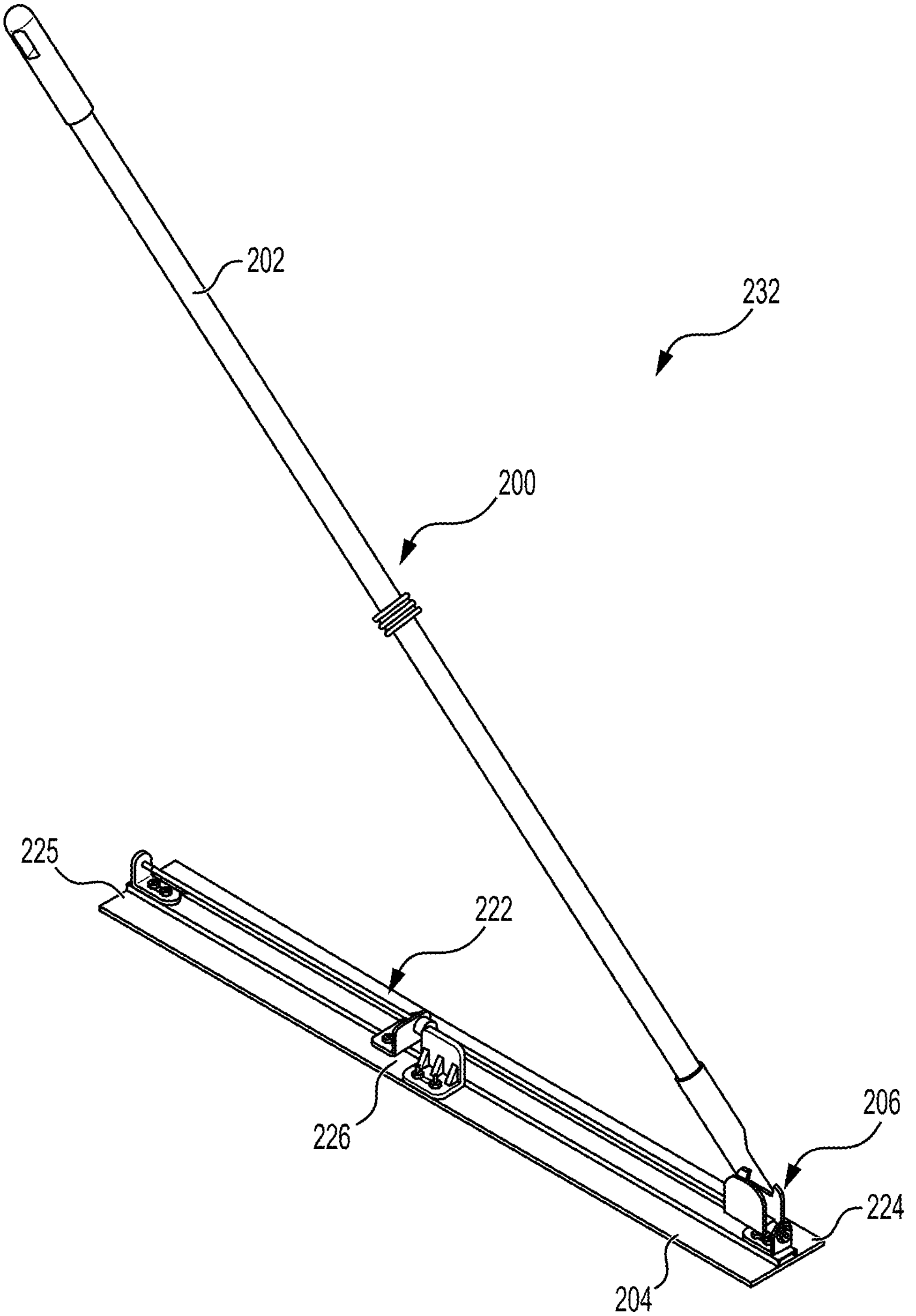
FIG. 6B illustrates the cleaning apparatus of FIG. 6A in a semi-folded configuration.
Figure 6C:
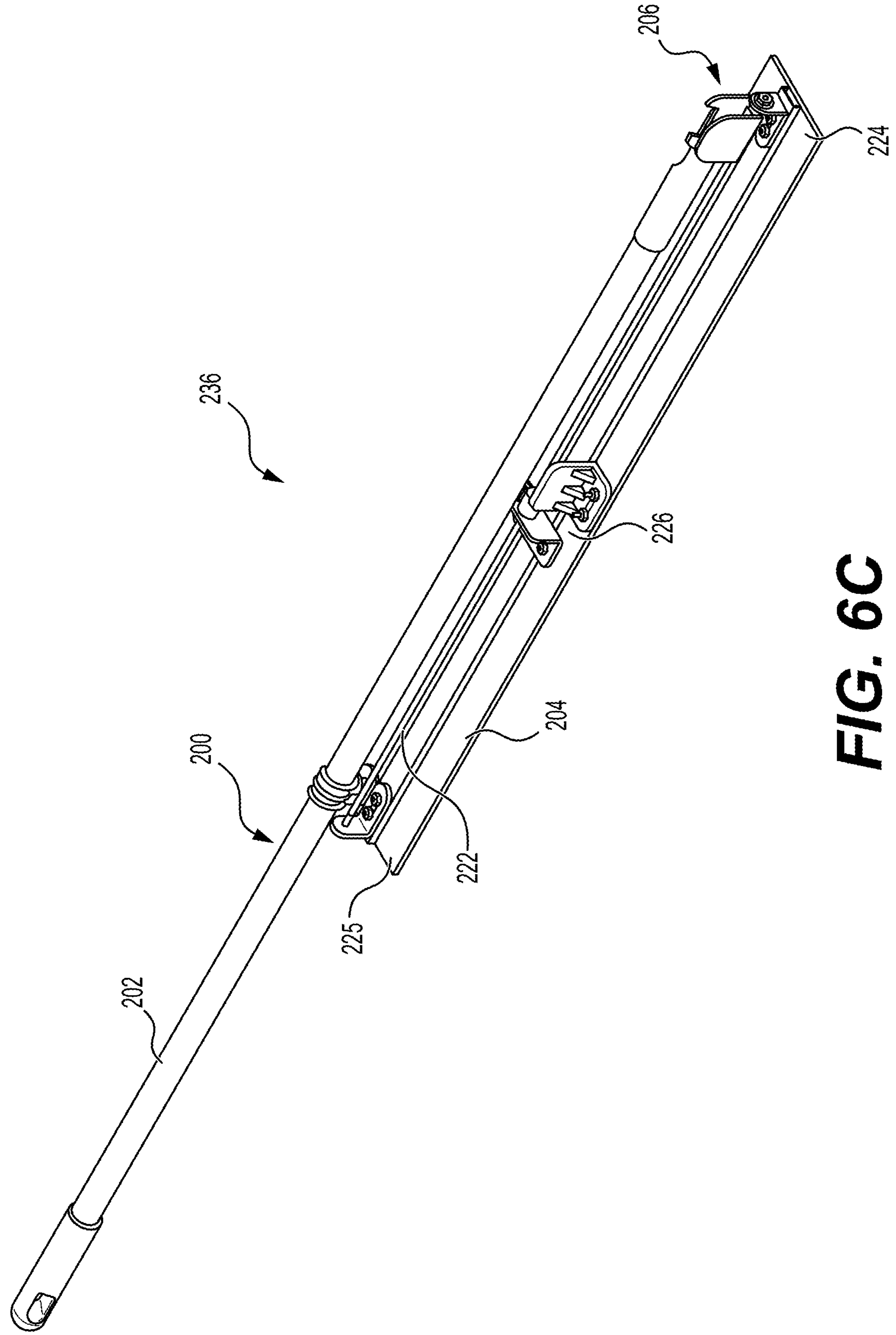
FIG. 6C illustrates the cleaning apparatus of FIG. 6A in a fully-folded configuration.
Figure 7:
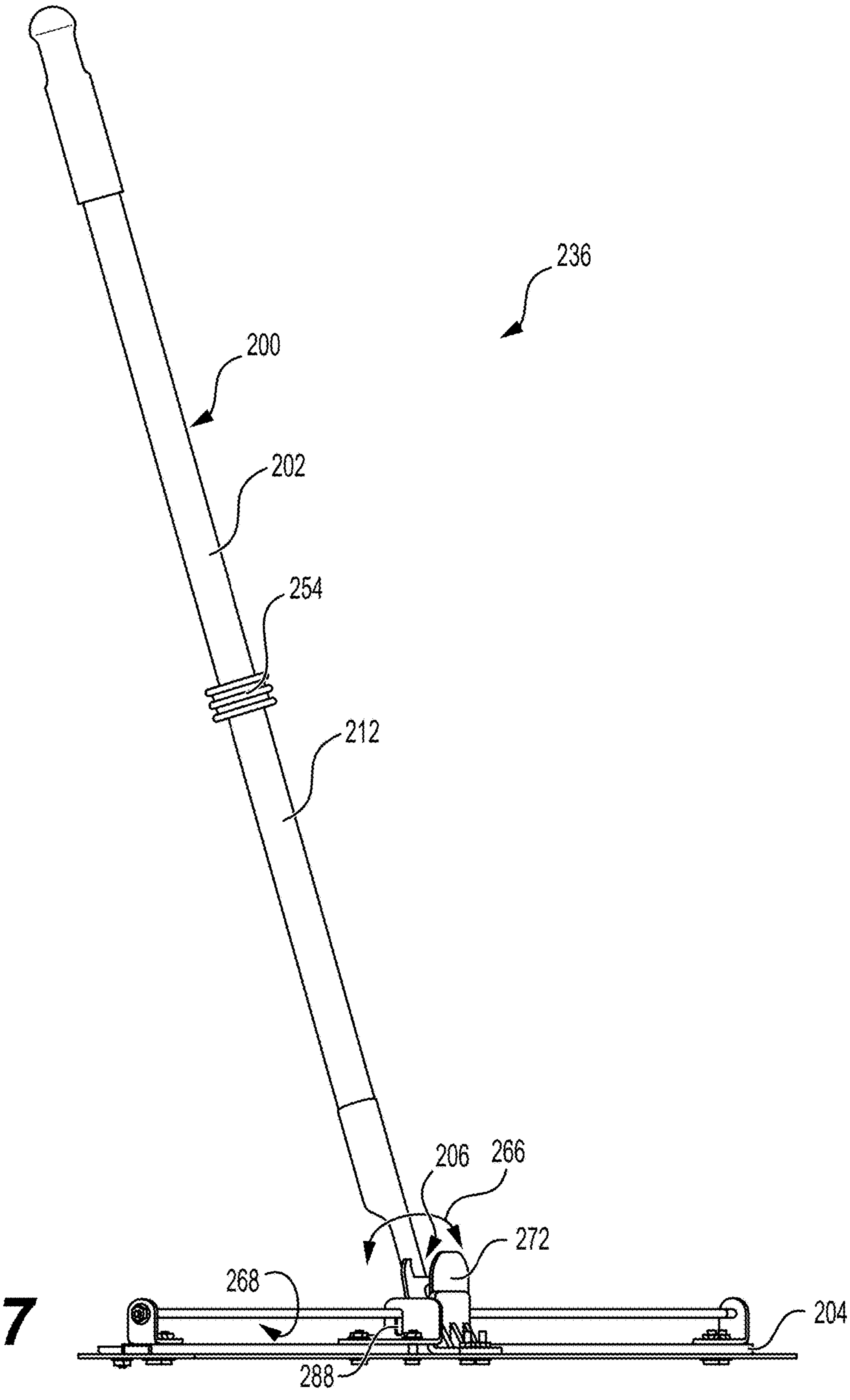
FIG. 7 illustrates a perspective view of the cleaning apparatus of FIG. 6A.
Figure 8:
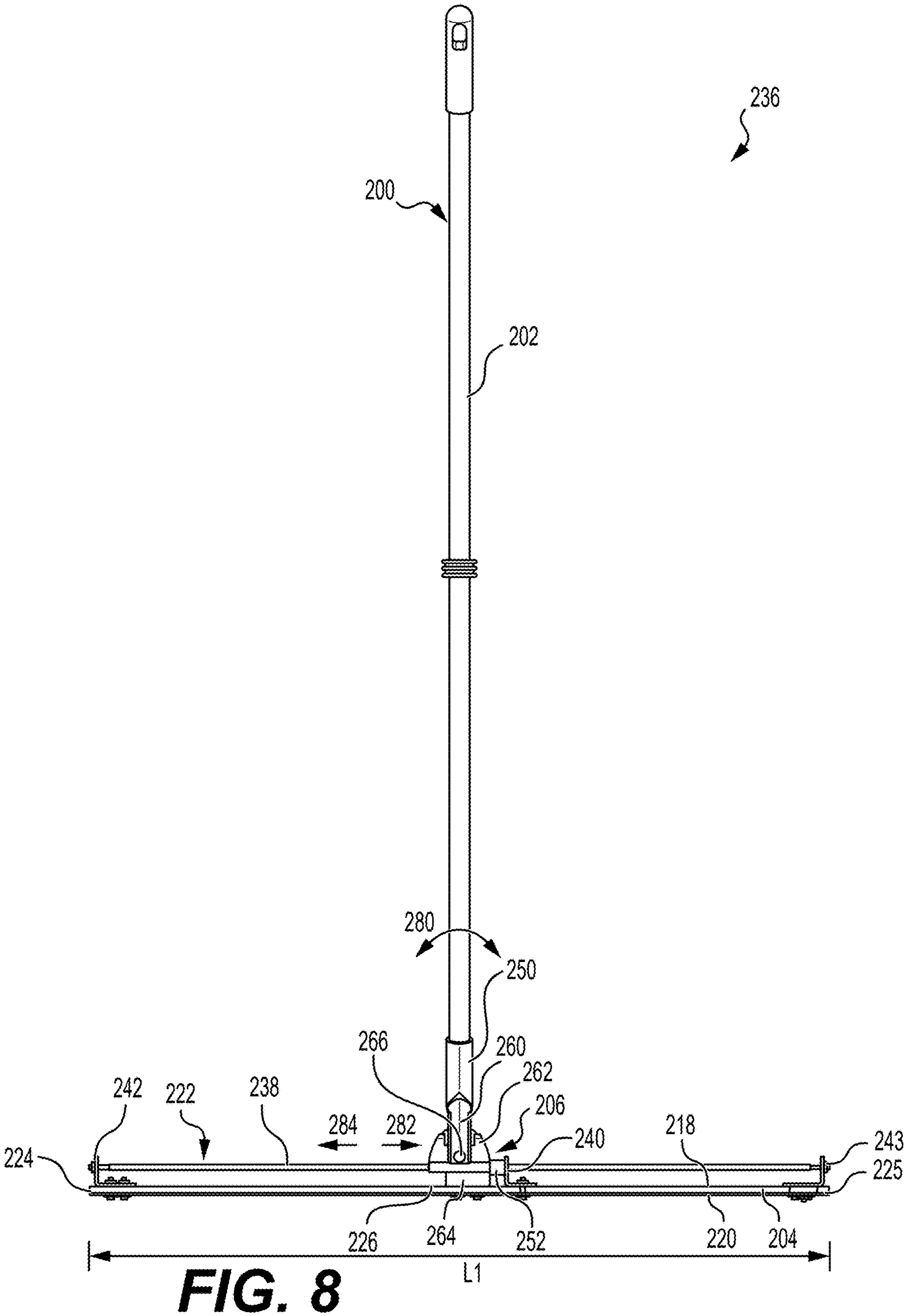
FIG. 8 illustrates a back view of the cleaning apparatus of FIG. 6A.
Figure 9:
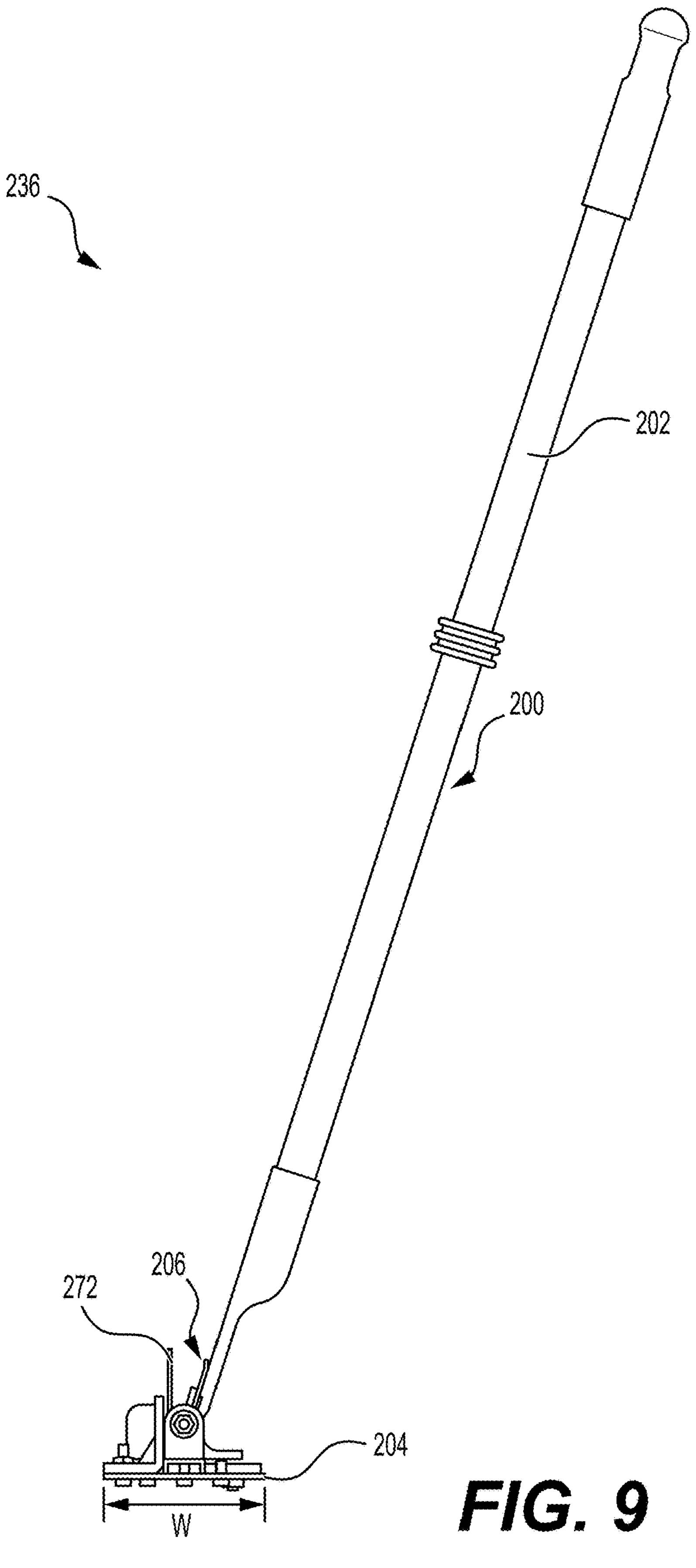
FIG. 9 illustrates a partial, side view of the cleaning apparatus of FIG. 6A.
Figure 10:
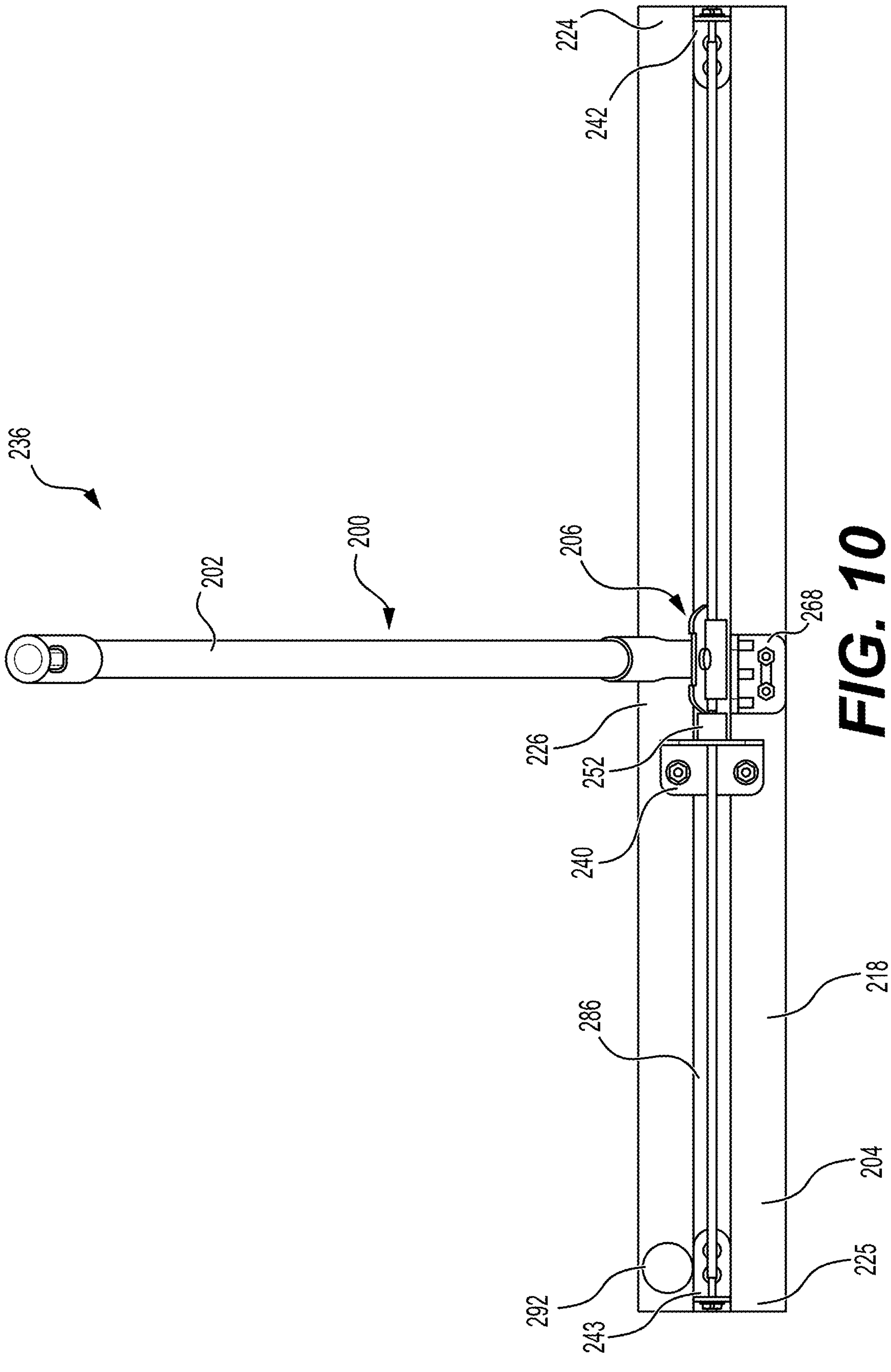
FIG. 10 illustrates a top view of the cleaning apparatus of FIG. 6A.

Referring now primarily to FIGS. 6A-6C, schematic diagrams of the foldable, quickly deployable cleaning apparatus 200 in fully-folded, semi-folded and fully unfolded (deployed) orientations are presented. FIG. 6A illustrates the cleaning apparatus 200 in a fully unfolded position 230, or fully-deployed position, ready to be used to clean the floor. FIG. 6B illustrates the cleaning apparatus 200 in a semi-folded position 232. FIG. 6C illustrates the cleaning apparatus 200 in a fully-folded position 236. The cleaning apparatus 200 may be placed in the fully-folded position 236 for storage or to reduce the cleaning apparatus's profile when not in active use cleaning the floor.

The cleaning apparatus 200 transitions between the fully unfolded or deployed position 230 and the fully-folded position 236 by sliding along the slide track 222. The pivot connection 206 allows the longitudinal handle 202 to move with respect to the first axis, or plane, 237 and the second axis, or plane, 239.

In FIG. 6A, the pivot connection 206 is located near the medial portion 226 of the base member 204 with the longitudinal handle 202 in an upright position. The cleaning apparatus 200 is in the deployed position 230.

In FIG. 6B, the pivot connection 206 slides to the first distal end 224 of the base member 204 with the longitudinal handle 202 angled relative to the slide track 222. The cleaning apparatus 200 is in the semi-folded position 232.

In FIG. 6C, the cleaning apparatus 200 is shown in the fully-folded position 236 with the pivot connection 206 positioned near the first distal end 224 of the base member 204 and the longitudinal handle 202 parallel to both the slide track 222 and the base member 204. FIG. 6C illustrates the cleaning apparatus 200 as being oriented horizontally against the ground while in the fully-folded position 236. However, it should be appreciated that the cleaning apparatus 200 may also be oriented in a vertical position or other positions for transport or storage.

Referring now primarily to FIGS. 7-10, the cleaning apparatus 200 is shown in the deployed or unfolded position 236 and aspects of the apparatus 200 will be described in more detail. As previously discussed, the handle 202 is attached to the pivot connection 206. In some embodiments, the longitudinal handle 202 is connected to the pivot connection 206 by a harness or sleeve 250. The longitudinal handle 202 may be connected to the pivot connection 206 similarly as described above with respect to the cleaning apparatus 100 of FIGS. 1-5.

The pivot connection 206 is connected to the base member 204 via engagement with the slide track 222. The base member 204 includes a first longitudinal edge 256, which is the leading edge of the base member 204 when the cleaning apparatus is deployed, and a second longitudinal edge 258, which is the trailing edge of the base member 204. In some embodiments, the base member 204 has a longitudinal or rectangular shape. The base member 204 has a longitudinal length L1 and a width W. In some embodiments, the length L1 of the base member 204 is between 12 and 60 inches. In yet some embodiments, the length L1 of the base member 204 is between 24 and 48 inches. In yet some embodiments, the length L1 is 36 inches. In some embodiments, the width W of the base member 104 is between 1 and 6 inches. In yet some embodiments, the width W of the base member 104 is 4 inches. The base member may be formed of aluminum, plastic, fiberglass, or other similar material.

The slide track 222 is attached to the first side 218 of the base member 204. In some embodiments, the slide track 222 includes a rod 238, a first distal slide stop or first distal bracket 242, a medial slide stop or medial bracket 240, a second distal bracket 243, and a first releasable attachment device 252.

In some aspects, the first distal bracket 242 is positioned adjacent to the first distal end 224 of the base member 204, the medial bracket 240 is positioned adjacent to the medial portion 226 of the base member 204, and the second distal bracket 243 is positioned outbound from the medial bracket 240. In yet some aspects, the second distal bracket 243 is positioned adjacent to the second distal end 225 of the base member 204. The rod 238 extends from the first distal bracket 242 to at least the medial bracket 240. In some embodiments, the rod 238 extends from the first distal bracket 242, through a vertical slot 288 in the medial bracket 240, to the second distal bracket 243. In some aspects, the rod 238 may help distribute the load more evenly to the base member 204 via the first and second distal brackets 242, 243.

The medial bracket 240 includes the vertical slot 288 formed therein, wherein the rod 238 is operable to move up and down within the vertical slot 288 when the cleaning apparatus 200 is deployed and in use. In some aspects, when a downward force is applied to the pivot connection 206 from a user while cleaning the floor, the pivot connection 206 may cause the rod 238 to flex or bow within the vertical slot 288.

In some embodiments, the rod 238 includes a retaining ring for holding the first releasable attachment device 252 adjacent the medial bracket 240. However, it should be appreciated that other means of holding the first releasable attachment device 252 in place may be used. In some embodiments, the medial bracket 240 is slightly outbound of midline so that the pivot connection 206 and the handle 202 can be aligned with the midline of the base member 202 when cleaning the floor.

In some embodiments, a roll plate or stop-gap plate 264 is attached to the first side 218 of the base member 204 proximate the medial portion 226 of the base member 204. The roll plate 264 may be positioned adjacent to the first longitudinal edge 256. In some aspects, the roll plate is on the midline of the base member 202. The roll plate 264 may engage aspects of the pivot connection 206 when the cleaning apparatus 200 is deployed and the longitudinal handle 202 has been tilted toward the user. The roll plate 264 is operable to prevent the base member 204 from flipping or rolling onto the first longitudinal edge 256 when force has been applied to the base member 204. In some embodiments, the roll plate 264 is positioned halfway between the first and second distal ends 224, 225 of the base member 204.

In some embodiments, a c-channel brace 286 is attached to the first side of the base member 204. The c-channel brace 286 extends at least a portion of the longitudinal length L1 of the base member 204. In some embodiments, the c-channel 286 extends from the first distal end 224 to the second distal end 225 of the base 204. In yet some embodiments, the c-channel 286 is positioned between the base member 204 and the slide track 222, such that the c-channel 286 is sandwiched between the base member 204 and the slide track 222. In some aspects, the c-channel may help prevent the base member 204 from bowing when force is applied to the first and second distal brackets 242, 243.

Still referring primarily to FIGS. 7-10, the first releasable attachment device 252 is positioned adjacent the medial bracket 240 and is operable to engage the pivot connection 206 when the cleaning apparatus is in the fully unfolded or deployed orientation. In some embodiments, the rod 238 extends through the first releasable attachment device 252. In yet some embodiments, the first releasable attachment device 252 contacts the medial bracket 240 and slides up and down against the face of the medial bracket 240 as the rod 238 flexes. If enough force is applied, the first releasable attachment device 252 will contact the base member 204 and apply pressure to the medial portion 226 of the base member 204. The first releasable attachment device 252 is strong enough to hold the pivot connection 206 near the medial portion 226 of the base member 204 and against the medial bracket 240 while the cleaning apparatus 200 is in use.

The first releasable attachment device 252 has a quick release capability that allows a user to quickly disengage the pivot connection 206 from the medial portion 226 of the base member 204, or the medial bracket 240, to allow the cleaning apparatus 200 to quickly fold. In some embodiments, the first releasable attachment device 252 is a magnetic member. In yet some embodiments, first releasable attachment device 252 is configured such that the user could apply force by their foot to disengage the first releasable attachment device 252 from the medial bracket 240. In other embodiments, the first releasable attachment device 252 is a clip or fastener. In some aspects, the first releasable attachment device 252 could be released using a button on the handle 202 or other releasing mechanism (not shown).

In some embodiments, a second releasable attachment device 254 is operable to hold the longitudinal handle 202 and the base member 204 together when the cleaning apparatus 200 is in the fully-folded position. The second releasable attachment device 254 may be positioned proximate a medial portion 212 of the handle 202. In some embodiments, the second releasable attachment device 254 is a clip that is removably connected to the handle 202. The second releasable attachment device 254 may include a magnetic member. In one illustrative embodiment, the second releasable attachment device 254 connects to a third releasable attachment device 292 connected to the base member 204. In some embodiments, the second releasable attachment device 254 includes a magnet that is affixed to the longitudinal handle 202 and the base member 204 is formed from a metallic material. In another illustrative embodiment, the second releasable attachment device 254 includes a magnet that is affixed to the longitudinal handle 202 that may be configured to connect with the third releasable attachment device 292, which may also be a magnet.

The pivot connection 206 may further include a post 260, a pivot plate 262, and a first articulating joint 266 at the junction between the post 260 and the pivot plate 262. The post 260 is connected to the sleeve 250, which is connected to the handle 202. In some embodiments, the post 260 and the sleeve 250 are one integral piece. The first articulating joint 266 allows the post 260 and, thus, the handle 202 to move relative to the pivot plate 262, as shown by arrow 280.

The pivot plate 262 further includes a clip 272 for engaging the rod 238 of the slide track 222, forming a second articulating joint 268. The pivot plate 262 can rotate about the rod 238 while also sliding along the rod 238 between the medial slide stop 240 and the distal slide stop 242, as represented by arrows 284 and 282, respectively. In some aspects, the clip 272 may be removable from the rod 238 to allow for a modular system.

The cleaning apparatus 200, further includes the absorbent or cleaning material 228 that is attached to the second side 220 of the base member 204. The cleaning material 228 may be attached to the second side 220 of the base member 204 using a third releasable attachment device 270.

In an alternative embodiment (not shown), the slide track may be grooves formed in the base member operable to receive a pivot connection and allow the pivot connection to slide along portions of the base member. In another alternative embodiment (not shown), the handle may include a telescoping feature that allows the length of the handle to be modified. In a non-limiting example, the length of the handle may extend between 47 and 77 inches.

Those skilled in the art will appreciate that while the apparatuses 100 and 200 have been presented in the context of an apparatus for cleaning sports courts, it may be readily use for cleaning any surface including home floors or commercial floors in buildings.

Although the present invention and its advantages have been disclosed in the context of certain illustrative, non-limiting embodiments, it should be understood that various changes, substitutions, permutations, and alterations can be made without departing from the scope of the invention as defined by the claims. It will be appreciated that any feature that is described in a connection to any one embodiment may also be applicable to any other embodiment.

What is claimed:

1. A foldable cleaning apparatus comprising:

a longitudinal handle having a first end and a second end;

a pivot connection coupled to the second end of the longitudinal handle, wherein the pivot connection is rotatable about at least two axes;

a longitudinal base member having a first side and a second side;

a slide track coupled to the first side of the longitudinal base member and extending from a first distal end to at least a medial portion of the longitudinal base member;

wherein the pivot connection slidably couples to the slide track and is operable to move along at least a portion of the slide track;

a mop material coupled at least partially to the second side of the longitudinal base member, wherein the second side faces is configured for facing a floor when the foldable cleaning apparatus is deployed and in use; and a releasable attachment device coupled proximate the medial portion of the longitudinal base member, wherein the releasable attachment device is a first releasable attachment device, the apparatus further comprising a second releasable attachment device for coupling the second end of the longitudinal handle to the first side of the longitudinal base member when the foldable, quickly deployable cleaning apparatus is in the folded, storage position.

2. The foldable, quickly deployable cleaning apparatus of claim 1, further comprising a first bracket coupled to the first distal end of the longitudinal base member, a medial bracket coupled to the medial portion of the longitudinal base member, and a second bracket coupled to the longitudinal base member between the medial portion and a second distal end, wherein the medial bracket is between the first and second bracket, and wherein the slide track includes a rod extending between the first bracket and the second bracket.

3. The foldable, quickly deployable cleaning apparatus of claim 2, wherein the medial bracket includes a vertical slot formed therein, wherein the rod is operable to move up and down within the vertical slot when the foldable, quickly deployable cleaning apparatus is deployed and in use.

4. The foldable, quickly deployable cleaning apparatus of claim 1, wherein the releasable attachment device holds the pivot connection proximate the medial portion of the longitudinal base member when the foldable, quickly deployable cleaning apparatus is deployed and in use.

5. The foldable, quickly deployable cleaning apparatus of claim 1, further comprising a stop-gap plate attached to the longitudinal base member proximate the medial portion, the stop-gap plate operable to engage the pivot connection when the cleaning apparatus is deployed.

6. The foldable, quickly deployable cleaning apparatus of claim 1, wherein the pivot connection is operable to move between the first distal end and the medial portion of the longitudinal base member.

7. The foldable, quickly deployable cleaning apparatus of claim 1, further comprising a c-channel brace positioned on the first side of the longitudinal base, the c-channel brace extending at least a portion of a longitudinal length of the longitudinal base.

8. The foldable, quickly deployable cleaning apparatus of claim 1, further comprising a c-channel brace positioned on the first side of the longitudinal base, the c-channel brace extending at least a portion of a longitudinal length of the longitudinal base, wherein the slide track is connected to the c-channel brace.

9. The foldable, quickly deployable cleaning apparatus of claim 1, wherein a length of the longitudinal base member is between 30 and 40 inches, and a width of the longitudinal base member is between 3 and 5 inches.

10. A foldable, floor cleaning apparatus comprising:

a handle having a first end and a second end;

a clip assembly fixed to the second end of the handle, wherein the clip assembly is rotatable about at least two axes;

a base member having a first side and a second side;

a slide track coupled to the first side of the base member and extending from a first distal end to a second distal end of the base member, wherein the slide track includes a rod, and wherein the clip assembly couples to the rod and is operable to move along the slide track between the first distal end and a medial portion of the base member;

a first releasable attachment device proximate the medial portion of the base member configured to hold the clip assembly in place when the foldable, floor cleaning apparatus is deployed and in use; and a second releasable attachment device for coupling the handle to the first side of the base member when the foldable, floor cleaning apparatus is in a folded, storage position.

11. The foldable, floor cleaning apparatus of claim 10, further comprising a first distal bracket coupled to the first distal end of the base member, a medial bracket coupled to the medial portion of the base member, and a second distal bracket coupled to the second distal end of the base member, wherein the slide track includes the rod extending between the first distal bracket and the second distal bracket.

12. The foldable, floor cleaning apparatus of claim 11, wherein the medial bracket includes a vertical slot formed therein, wherein the rod is operable to move up and down within the vertical slot when the foldable, floor cleaning apparatus is deployed and in use.

13. The foldable, floor cleaning apparatus of claim 10, wherein the clip assembly is operable to move between the first distal end and the medial portion of the base member, and wherein the medial bracket prevents the clip assembly from moving past the medial portion of the base member.

14. The foldable, floor cleaning apparatus of claim 10, further comprising a c-channel brace positioned on the first side of the base member, the c-channel brace extending at least a portion of a length of the base member, wherein the slide track is connected to the c-channel brace.

15. The foldable, floor cleaning apparatus of claim 10, further comprising a mop material coupled at least partially to the second side of the base member, wherein the second side faces a floor when the foldable, floor cleaning apparatus is deployed and in use.

16. A cleaning apparatus comprising:
- a handle having a first end and a second end;
- a pivot connection coupled to the second end of the handle, wherein the pivot connection is rotatable about at least two axes;
- a base member having a first side and a second side;
- a c-channel positioned on the first side of the base member, the c-channel extending at least a portion of a length of the base member;
- a slide track coupled to the first side of the base member and extending from a first distal end beyond a medial portion of the base member, wherein the pivot connection couples to the slide track and is operable to move along the slide track between the first distal end and the medial portion of the base member;
- a stop-gap plate attached to the base member proximate the medial portion, the stop-gap plate operable to engage the pivot connection when the cleaning apparatus is deployed;
- a first releasable attachment device proximate the medial portion of the rectangular base member configured to hold the pivot connection in place when the cleaning apparatus is deployed and in use;
- a second releasable attachment device for coupling the handle to the first side of the base member when the cleaning apparatus is in a folded, storage position; and
- a mop material coupled at least partially to the second side of the base member, wherein in the second side faces a floor when the cleaning apparatus is deployed and in use.

17. The cleaning apparatus of claim 16, wherein the base member has a rectangular shape, having a length between 30 and 40 inches, and a width between 3 and 5 inches.

18. The cleaning apparatus of claim 16, wherein the slide track is connected to the c-channel.

19. The cleaning apparatus of claim 16, further comprising:
- a first distal bracket coupled to the first distal end of the base member;
- a medial bracket coupled to the medial portion of the rectangular base member;
- a second distal bracket coupled to a second distal end of the base member;
- wherein the slide track includes a rod extending between the first distal bracket and the second distal bracket; and
- wherein the medial bracket includes a vertical slot formed therein, wherein the rod is operable to move up and down within the vertical slot when the cleaning apparatus is deployed and in use.

* * * * *